United States Patent [19]

Bartlow

[11] 3,716,144

[45] Feb. 13, 1973

[54] SCREEN HAVING PARALLEL SLOTS AND METHOD

[75] Inventor: Aulden H. Bartlow, Carbondale, Pa.

[73] Assignee: Hendrick Manufacturing Company, Carbondale, Pa.

[22] Filed: March 9, 1971

[21] Appl. No.: 122,441

[52] U.S. Cl. .................................................210/499
[51] Int. Cl. ...........................................B01d 39/10
[58] Field of Search.......210/497.1, 499, 497 H, 498; 166/231–234; 209/393–395, 405, 408; 29/160, 509; 52/667, 668

[56] References Cited

UNITED STATES PATENTS

| | | | |
|---|---|---|---|
| 1,620,846 | 3/1927 | Wells | 52/667 |
| 1,769,128 | 7/1930 | Fisher | 209/395 |
| 1,951,653 | 3/1934 | Green | 52/667 |
| 689,934 | 12/1901 | Vrooman et al | 209/395 |

Primary Examiner—Reuben Friedman
Assistant Examiner—F. F. Calvetti
Attorney—Dybvig & Dybvig

[57] ABSTRACT

A screen having parallel slots therethrough comprises a plurality of rods supported in spaced parallel relation by transversely extending support members. The support members comprise spaced side walls having upper edges upon which the rods rest and bridges extending upwardly and between the rods to connect the side walls as one piece. The rods are anchored to the support members by swaging the rods at points below the elevation of said bridges in a fashion that displaces material in the rods to positions underlying said bridges, thus creating an interference lock between the rods and the bridges.

7 Claims, 12 Drawing Figures

PATENTED FEB 13 1973　　3,716,144

INVENTOR.
AULDEN H. BARTLOW
BY
HIS ATTORNEYS

SCREEN HAVING PARALLEL SLOTS AND METHOD

BACKGROUND OF THE INVENTION

1. Field of the Invention

This invention relates to screens of the type used for drainage, sizing, dewatering and washing coal and ores and for sand recovery and the like. The invention also relates to a method of manufacturing such screens.

2. Description of the Prior Art

It is known to fabricate screens for the above described purposes by mounting rods in a spaced parallel relation to define openings of a predetermined size therebetween. In some cases the screen rods are equipped with depending flanges which project into slots of a transverse support member, the slots being spaced along the length of the support member to accurately establish the spaces or openings between the screen rods. The flanges are made vertically large enough to project downwardly through portions of the support members a sufficient distance that transverse lock pins can be passed through suitably located holes in the flanges and under the support members to lock the rods to the support members. For purposes of economy, the depending flanges are relatively thin compared to the width of the rods which define the screen slots. In an alternative construction the flanges which depend from the screen rods are eliminated and the slots in the screen support members are made wide enough to receive the screen rods themselves. The screen rods are then secured to the support members by applying weld beads to the screen rods. The weld beads are applied after the screen rods have been fitted to the support members at positions which will block the subsequent removal of the screen rods from the support members.

SUMMARY OF THE INVENTION

The present invention is concerned with an improved and simplified means to lock screen rods to their support members. In each of the above described prior art constructions, a lock between the screen rods and their support members was achieved by adding a locking means such as a weld bead or a lock pin to the screen rod. In contrast to this prior art, the present invention produces a lock between screen rods and their support members by swaging the screen rods in a fashion that will produce an interference misfit between the screen rods and their support members.

It is an object of the present invention to provide a new and improved parallel slot screen construction.

Another object of the present invention is to provide a new and improved method for assembling parallel rods in screen devices.

Other objects and advantages reside in the construction of parts, the combination thereof, the method of manufacture and the mode of operation, as will become more apparent from the following description.

DETAILED DESCRIPTION OF THE PREFERRED EMBODIMENTS

Figure 1:
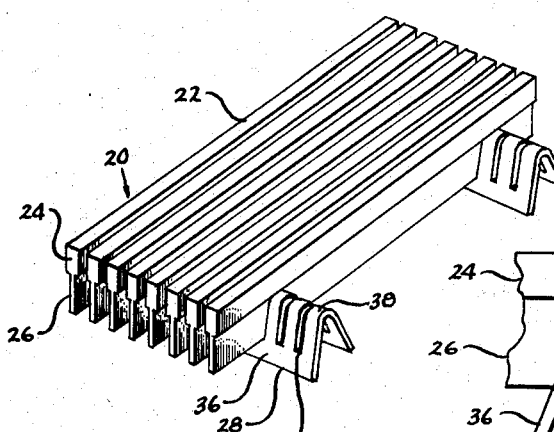
FIG. 1 is a perspective view of a screen constructed in accordance with the present invention, two screen rods having been omitted to reveal constructional details.

The screen embodiment of FIG. 1 comprises a plurality of parallel profile rods or bars 20 supported by generally trough-shaped support members 28 which extend transverse to the rods 20. The rods 20 are characterized by a relatively thick upper section 24 and a relatively thin lower section or flange 26. The upper section 24 is rendered somewhat rectangular by reason of parallel sides. The particular rod profile illustrated in FIG. 1 provides an upper working surface 22 which can encounter considerable wear before a change in the width of the spaces or slots between screen rods will occur. Numerous other profiles for rods such as the rods 20 illustrated in FIG. 1 are commercially available and utilization of the present invention is not limited to any particular profile.

The support members 28 are formed from initially flat metal sheets 30 which have been perforated to provide elongated slots 32 therein. As appears in FIG. 2, the slots 32 are parallel to one another and oriented in a direction which is perpendicular to the longest side margins of the sheet 30. The slots 32 each terminate with end margins 34 which are spaced equally from the longest side margins of the sheet 30. There remains adjacent each of the longer sides of the sheet 30 a band or wall of unperforated sheet metal which has been designated with the reference number 36.

Figure 2:
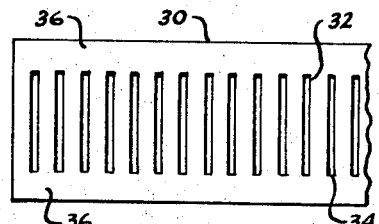
FIG. 2 is a fragmentary plan view of a perforated sheet used in forming the support members for the screen of FIG. 1.

In order to produce a support member 28, the sheet 30 illustrated in FIG. 2 is bent along a medial line located centrally between and extending parallel to the longest side margins of the sheet 30. Preferably the bending of the sheet 30 produces a gently rounded arch as opposed to a sharp crease so that the walls 36 become angularly disposed as appears in FIG. 3 and the sections between the slots 32 become bridges or arches 38 which connect the walls 36.

Commencing with a plurality of similarly formed support members 28, assembly of a screen in accordance with the present invention proceeds by fitting the flanges 26 of the screen rods 20 between the bridges 38 of the support members 28. As will later appear more fully, this assembly is conveniently made upside down from the structure shown in FIG. 1 with the rod surfaces 22 resting on a flat press platen. The slots 32 are dimensioned to snugly receive the flanges 26 and accordingly the rods 20 align the support members 28 in parallel relationship. At the same time, the support members 28 position the rods 20 in equally spaced, parallel relationship. In this assembly, the longitudinal margins of the flanges 26 contact the end margins 34 of the slots 32 in the support members 28 and thus, in effect, contact the edges of the walls 36 illustrated in FIG. 2.

Figure 3:
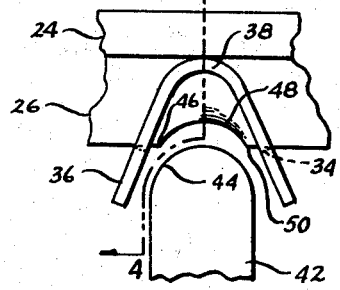
FIG. 3 is a fragmentary side elevation view illustrating the appearance of a screen rod after having been anchored by swaging to a screen support member and, in fragmentary end elevation, the swaging tool separated from the screen rods and the support member.

As above indicated, the screen elements are preferably assembled on the lower platen of a suitable press device, not shown, with the walls 36 of one of the support members 28 straddling an elongated swaging blade or die 42 mounted to the upper platen of the press. The press is then operated through one cycle to cause the die 42 to swage the margins of the flanges 26 between the walls 36 which straddle the die 42. FIG. 3 shows the shape of the die 42 in end elevation and FIGS. 3 and 4 also show the deformation or distortion in the flanges 26 which is produced by the working surface 44 of the die 42. The die 42 is at least as long as the support members 28 so that all of the rods 20 in the screen assembly are simultaneously swaged in one cycle of press operation.

Figure 4:
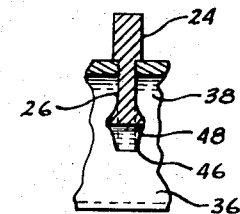
FIG. 4 is a fragmentary section view taken substantially along the line 4—4 of FIG. 3.

As appears in FIGS. 3 and 4, the swaging action of the die 42 forms an arcuate indentation 48 in each of the flanges 26 and in so doing causes metal to flow laterally in a direction perpendicular to the flat sides of the flanges 26, thus thickening the flanges 26 adjacent the indentations 48.

This thickening of the flanges 26 makes it impossible to separate the screen rods 20 from the screen support members 28. Thus, the flanges 26 are initially a snug fit between the bridges 38 and, because the flanges 26 have now been thickened at one of the support members, the flanges 26 cannot be retracted from such support member.

With reference to FIG. 4 especially, it can be noted that the thickening of the flanges 26 is greatest where the die 42 has penetrated most deeply into the flanges and diminishes toward the corners 46 and 50 where the arcuate indentations 48 meet the original free margins of the flanges 26. It will also be noted that the region of thickening does not reach the apices of the bridges 38. In the preferred practice of the present invention, the die 42 is sized with respect to the support members 28 so that the thickening produced in the swaged margins of the flanges 26 will have a sufficient longitudinal extent that the corners 46 and 50 project "under" the bridges 38 adjacent the end margins 34 of the slots 32. This produces an interference lock close to the ends of the bridges 38 without requiring a deep penetration of the die 42 into the flanges 26.

The press used to produce this swaging operation is preferably a press having a limited travel of its upper platen, such as a brake press. This allows the penetration of the die 42 into the flanges 26 to be accurately controlled.

While FIG. 1 illustrates only eight screen rods 20 and places for two additional screen rods, those skilled in the art will realize that screens used in actual industrial practice will be much larger than suggested by FIG. 1, having an overall width which is typically two feet and having an overall length which may be several feet. The number of screen rods per inch along the length of the support members 28 will vary depending upon the application, and in some applications there will be as many as eight rods per inch along the length of the support members 28. In the preferred mode of assembly, only a single die 42 is required and with successive press operating cycles, the screen assembly is slid on the lower platen to successively align each of the support members 28 with the die 42 so as to swage all of the rods 20 in the screen at each of the support members 28. The resulting structure is a rigid self-aligned screen.

Figure 5:
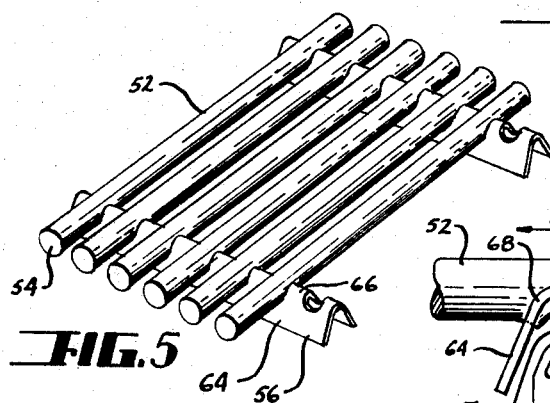
FIG. 5 is a perspective view of a first modification, one of the screen rods having been omitted reveal constructional details.
Figure 6:
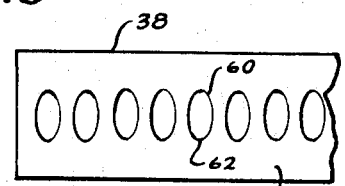
FIG. 6 is a fragmentary plan view of a perforated sheet used in forming the support members for said first modification.

The first modification of FIG. 5 comprises a screen formed of rods 52 which are cylindrical, as evidenced by their end profile 54. The rods 52 are mounted in spaced, parallel relationship upon support members 56.

The formation of the support members 56 commences with a flat metal sheet or plate 58 having spaced, somewhat eliptical perforations 60 therethrough. The longer axes of these eliptical perforations are arranged perpendicular to the longer side edges of the plate 58. The rounded ends 62 of the perforations are spaced equally from the longer side edges of the plate 58 to provide unperforated wall portions 64 along the longer side edges of the plate 58. The support members 56 are formed by bending plates 58 about a medial line extending midway between the longer side margins of the plate.

Figure 7:
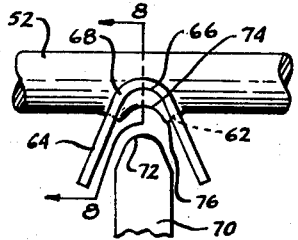
FIG. 7 is a fragmentary side elevation view illustrating a screen rod and a screen support member after the screen rod has been anchored to the support member by swaging and, in fragmentary end elevation, the swaging tool separated from the screen rods and the support member.

As appears in FIG. 7, the bending of the plate 58 causes the portions of the sheet between the perforations 60 to form bridges or arches 66 which support the wall portions 64 at an angle which diverges in the direction away from the bridges 66. The eliptical perforations 60 are so shaped that when the plate 58 has been bent as appears in FIG. 7 and the rods 52 assembled thereon, the rounded ends 62 of the perforations 60 will interfit the arcuate walls of the rods 52 and the side margins of the bridges 66 will follow the wall contours of the rods 52. The bridges 66 are designed to rise upwardly between the rods 52 a distance which is approximately half the vertical height of the rods 52, i.e., half the diameter of the rods 52.

In the manner previously described, the rods 52 and support members 56 are assembled between the platens of a suitable press device at a position where the side walls 64 of a support member 56 straddle an elongated swaging blade 70 as shown in FIG. 7. The swaging blade 70 which appears in end elevation in FIG. 7 has a length which is at least as great as the length of the support members 56 so that all support rods assembled in a given support member 56 can be swaged in one cycle of press operation.

Figure 8:
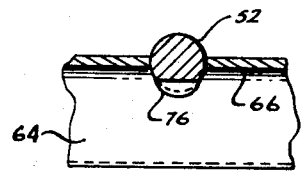
FIG. 8 is a fragmentary section view taken substantially along the line 8—8 of FIG. 7.

It will be noted that the working surface 72 of the swaging blade 70 is more sharply curved than is the working surface 44 of the previously described swaging blade 42. This sharper curvature in the working surface 72 causes a movement of metal lengthwise along the rods 52 when the swaging blade is pressed against the rods 52 to form indentations 74 therein. Thus, as shown in FIGS. 7 and 8, protrusions 75 will form "under" the bridges 66 adjacent the ends of the bridges as the indentations 74 are formed. As a result, an interference lock is developed between the rods 52 and the support members 56 by a longitudinal flow of metal toward the rounded ends 62 of the perforations 60. A penetration of the swaging blade which will affect the diameters of the rods 52 at the apices of the bridges 66 is not required. As is evident in FIG. 8 the swaging tool 70 has developed an interference between the protrusions 76 and the bridges 66 without developing any appreciable interference lock between the rods 52 and the apices of the bridges 66.

Figure 9:
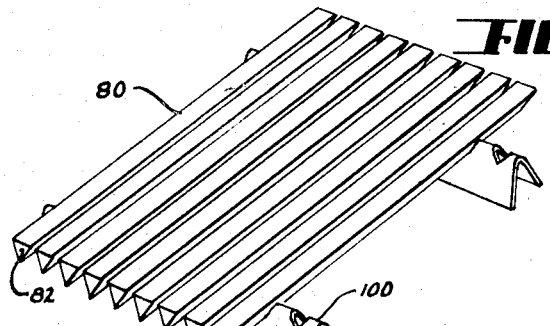
FIG. 9 is a perspective view of a second modification, one of the screen rods having been omitted to reveal constructional details.
Figure 10:
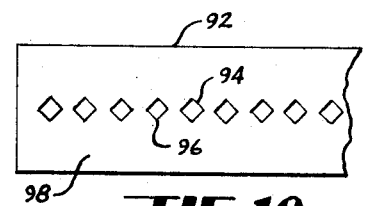
FIG. 10 is a fragmentary plan view of a perforated sheet used in forming the screen support members for said second modification.

FIG. 9 illustrates a third modification of the present invention wherein screen rods 80 having a triangular cross section as manifested by the end profile 82 are assembled upon support members 90. The support members 90 are formed from metal sheets 92 having rectangular or essentially square perforations 94 therein. The perforations 94 are so arranged that opposite corners 96 thereof point toward the longer side edges of the sheet 92 and are spaced from the opposite side walls so as to provide unperforated wall portions 98 adjacent the longest side edges of the sheet 92. When the sheet 92 is bent along a medial line extending between its longer side edges to the shape illustrated in FIG. 9, the margins of the perforations 94 form open-centered troughs, each of which will snugly receive one apex of a triangular rod 80. The troughs are separated by arches or bridges 100.

Figure 11:
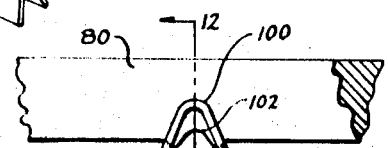
FIG. 11 is a fragmentary side elevation view illustrating a screen rod and a screen support member after anchored together by swaging.

In the manner previously described, a plurality of rods 80 are assembled on support members 90 as shown in FIG. 9 and positioned between the platens of a suitable press with the side walls 98 of at least one support member 90 straddling a swaging blade similar to the previously described blade 70. As is evident in the shape of the indentation 102 illustrated in FIG. 11, however, the swaging blade, not shown, is somewhat more sharply curved at its working surface than the blade 70 previously described.

Figure 12:
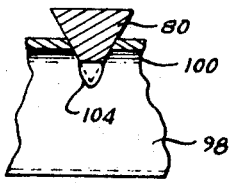
FIG. 12 is a fragmentary section view taken substantially along the line 12—12 of FIG. 11.

Upon operation of the press to swage the rods 80 and thus produce the indentations 102 in the apices of the rods 80, metal is moved longitudinally along the length of the rods 80 to form protrusions 104 adjacent the indentations 102. As best appears in FIG. 12, the protrusions 104 spread over the corners 96 in the perforations 94 so as to form interference locks between the rods 80 and the support members 90. As is also evident in FIG. 12, this interference lock is produced by a relatively small penetration of the swaging blade into the swaged apex of the triangular rods 80. Thus, the penetration is not great enough to significantly affect the thickness of the rods 80 at the apices of the bridges 100 formed in the support members 90.

In this third modification as well as the preceding two embodiments, there exists from a theoretical point of view two basic approaches for swaging the rods to an interference fit with the support members. One is to so swage the rods that a longitudinal flow of metal occurs to produce an interference with opposite ends of the bridges in the support members, the predominant direction of metal flow being along the length of the rods. The alternative would be a swaging action in which metal is caused to flow under the bridges of the support members in a predominant direction which is along the length of the support members and thus transverse to the length of the screen rods. As evident in FIGS. 4, 8 and 12, such a metal flow would require a considerably deeper penetration of the swaging blade into the support rods and therefore a proportionately larger application of pressure to the support rods. As the pressure is increased, however, the possibility of a distortion of the working surfaces of the screen which are opposite the swaged portions of the rods increases. The present invention which accomplishes an interference lock by a longitudinal flow at a relatively low pressure is the preferred mode for locking the screen rods to the support members since it minimizes the possibility of damage to the working surfaces in the screen rods.

Preferred materials for use in the practice of the present invention include steel, brass and aluminum as general examples. Those skilled in the art will understand that the selection of materials for use in producing the screens of the present invention will depend upon both the nature of the material to be processed with the screens and the wear characteristics required of the screens. The foregoing examples of materials that might be selected for use in the manufacture of screens are intended as merely illustrative examples as many other materials and alloys thereof are considered within the purview of this invention.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A screen device comprising a plurality of spaced and generally parallel rods, a support member disposed transverse to said rods, said support member comprising spaced apart walls having upper edge portions underlying said rods, said support member including spaced apart bridge members each spanning the space between said walls and each having opposite end portions joined to upper portions of said walls, each said rod flanked by adjacent bridge members, each rod having protrusions spaced apart primarily along its length and projecting under its flanking bridge members, said protrusions spaced to engage said bridge members adjacent both end portions thereof.

2. The screen device of claim 1 wherein each said rod comprises a flange interfitting the space between its flanking bridge members, said protrusions being swaged from said flange.

3. The screen device of claim 1 wherein said rods are circular in cross section except where distorted by swaging to produce said protrusions.

4. The screen device of claim 1 wherein said rods each have a triangular cross section defined by three longitudinally extending apices, said protrusions spaced apart along one of said apices.

5. The screen device of claim 1 wherein said bridge members have side edges interfitting said rods except at said protrusions.

6. The screen device of claim 1 wherein said bridge members arch upwardly between said support members.

7. In the method of anchoring a plurality of screen rods to a support member, said support member comprising spaced apart walls joined by bridge members spaning the space between said walls and each having end portions engaged to said walls, the steps of positioning said rods transverse to said walls, each rod being disposed between an adjacent pair of bridge members, and advancing a single elongate swaging blade between said walls to simultaneously indent all of said rods transversely of their length to cause material of said rods to move primarily lengthwise along said rods and seize the end portions of said bridge members.

* * * * *